(12) United States Patent
Zhang et al.

(10) Patent No.: US 11,686,512 B2
(45) Date of Patent: Jun. 27, 2023

(54) ELECTRONIC EXPANSION VALVE, MANUFACTURING METHOD THEREOF, AND THERMAL MANAGEMENT ASSEMBLY

(71) Applicant: ZHEJIANG SANHUA INTELLIGENT CONTROLS CO., LTD, Zhejiang (CN)

(72) Inventors: Rongrong Zhang, Zhejiang (CN); Dazhao Zha, Zhejiang (CN); Yingchong Lu, Zhejiang (CN); Lei Zhou, Zhejiang (CN)

(73) Assignee: ZHEJIANG SANHUA INTELLIGENT CONTROLS CO., LTD, Zhejiang (CN)

( * ) Notice: Subject to any disclaimer, the term of this patent is extended or adjusted under 35 U.S.C. 154(b) by 0 days.

(21) Appl. No.: 17/044,705

(22) PCT Filed: Jul. 16, 2019

(86) PCT No.: PCT/CN2019/096207
§ 371 (c)(1),
(2) Date: Oct. 1, 2020

(87) PCT Pub. No.: WO2020/015654
PCT Pub. Date: Jan. 23, 2020

(65) Prior Publication Data
US 2021/0033322 A1    Feb. 4, 2021

(30) Foreign Application Priority Data

Jul. 20, 2018 (CN) .......................... 201810801389.8
Jul. 20, 2018 (CN) .......................... 201810801412.3
Jul. 20, 2018 (CN) .......................... 201810801473.X

(51) Int. Cl.
*F25B 49/02* (2006.01)
*F25B 41/31* (2021.01)

(52) U.S. Cl.
CPC .............. *F25B 41/31* (2021.01); *F25B 49/02* (2013.01)

(58) Field of Classification Search
CPC .......... F25B 41/31; F25B 49/02; F25B 41/32; F25B 41/325; F25B 41/33; F25B 49/022; F25B 49/005; F25B 49/00
See application file for complete search history.

(56) References Cited

FOREIGN PATENT DOCUMENTS

| CN | 1221859 A | 7/1999 |
| CN | 2619059 Y | 6/2004 |

(Continued)

OTHER PUBLICATIONS

Lu, Electronic expansion valve and including electronic expansion valve's hot management component, 2017, Full Document (Year: 2017).*

(Continued)

*Primary Examiner* — Nael N Babaa
(74) *Attorney, Agent, or Firm* — Crain Caton & James; William P. Jensen

(57) ABSTRACT

Provided are an electronic expansion valve, a manufacturing method thereof and a thermal management assembly. The electronic expansion valve includes a valve body, a valve component and a control portion. The valve component includes a valve seat, a valve core and a rotor assembly. The valve seat is formed with a valve port, the rotor assembly is capable of driving the valve core to move relative to the valve seat to adjust an opening degree of the valve port. The control portion includes a cover body, a stator assembly and an electric control board. The stator assembly is in electrical connection to, or is in signal connection to, or is in electrical connection to and in signal connection to the electric control board. The electronic expansion valve further includes a (Continued)

sensor. The control portion provided with a control cavity. The electric control board is disposed in the control cavity.

14 Claims, 7 Drawing Sheets

(56) References Cited

FOREIGN PATENT DOCUMENTS

| CN | 101777239 | A | | 7/2010 |
|---|---|---|---|---|
| CN | 103453201 | A | | 12/2013 |
| CN | 203783912 | U | | 8/2014 |
| CN | 104676068 | A | | 6/2015 |
| CN | 204878971 | U | | 12/2015 |
| CN | 204965234 | U | | 1/2016 |
| CN | 105822769 | A | | 8/2016 |
| CN | 206130251 | U | | 4/2017 |
| CN | 106996662 | A | | 8/2017 |
| CN | 107542948 | A | | 1/2018 |
| CN | 206874939 | U | | 1/2018 |
| CN | 107655241 | A | | 2/2018 |
| CN | 207049366 | U | * | 2/2018 |
| CN | 207049366 | U | | 2/2018 |
| CN | 107763284 | A | | 3/2018 |
| CN | 108119699 | A | | 6/2018 |
| EP | 2821682 | A1 | | 11/2015 |
| JP | H10205927 | A | | 8/1998 |
| JP | H1165675 | A | | 3/1999 |
| JP | 2000227165 | A | | 8/2000 |
| JP | 2012031898 | A | | 2/2012 |
| JP | 2019211180 | A | | 12/2019 |
| KR | 20010105743 | A | | 11/2001 |
| KR | 100375454 | B1 | | 3/2003 |
| KR | 100609018 | B1 | | 8/2006 |

OTHER PUBLICATIONS

Kotoku Yamazaki, Notice of Reasons for Refusal, Japanese Patent Application No. 2020-561870, dated Dec. 20, 2021, 5 pages, Japan Patent Office, Japan.
Yoon Maru, Notification of Reason for Refusal, Korean Patent Application No. 10-2020-7032878, dated Jan. 12, 2022, 5 pages, Korean Intellectual Property Office, Korea.
Cen Junjian etc, Non-standard Mechanical Design Manual, Chapter IV Pin Connection, Jul. 2008, pp. 425, National Defense Industry Press, China.
Geng Qian, International Search Report for PCT App. No. PCT/CN2019/096207, dated Sep. 4, 2019, 4 pages, China National Intellectual Property Administration, China.
Search Report for CN App. No. 201810801389.8, 2 pages, China National Intellectual Property Administration, China.
Ren Zhian, First Office Action for CN App. No. 201810801389.8, dated May 18, 2020, 19 pages, China National Intellectual Property Administration, China.
Search Report for CN App. No. 201810801473.X, 2 pages, China National Intellectual Property Administration, China.
Yang Xinmeng, First Office Action for CN App. No. 201810801473.X, dated May 18, 2020, 13 pages, China National Intellectual Property Administration, China.
The State Intellectual Property Office of People's Republic of China, The Second Office Action, Patent Application No. 201810801389.8, dated Oct. 23, 2020, 4 pages, The State Intellectual Property Office of the People's Republic of China, Beijing China.

* cited by examiner

US 11,686,512 B2

ELECTRONIC EXPANSION VALVE, MANUFACTURING METHOD THEREOF, AND THERMAL MANAGEMENT ASSEMBLY

This application is a U.S. National Stage Application of PCT Application Serial No. PCT/CN19/96207, filed Jul. 16, 2019, which claims priority to Chinese Patent Applications No. 201810801473.X, No. 201810801389.8 and No. 201810801412.3 filed Jul. 20, 2018, the disclosures of which are incorporated herein by reference in their entireties.

TECHNICAL FIELD

The present disclosure relates to the technical field of fluid control, for example, relates to an electronic expansion valve, a manufacturing method thereof and a thermal management assembly.

BACKGROUND

A refrigeration system includes a compressor, an evaporator, a condenser and a throttling element, and an expansion valve is commonly used as the throttling element. To improve control precision, an electronic expansion valve is commonly used as the throttling element, and the electronic expansion valve can be used for throttling a working medium of the refrigeration system (for example: a refrigerant). The electronic expansion valve is an electrically controllable device, a sensor is further disposed on an outlet pipeline of the evaporator of the refrigeration system to collect relevant parameters of the working medium at the outlet of the evaporator, the sensor is connected to a control unit through a wire harness, and after acquiring the relevant parameters, the control unit adjusts the opening degree of the electronic expansion valve according to a corresponding control program. In this way, the mechanical connection and electrical connection of the sensor are involved, resulting in a relatively complicated structure. The sensor and the valve body of the electronic expansion valve are separately connected to the refrigeration system, so that the assembly reference is not uniform, and the assembly process is relatively complex.

SUMMARY

An electronic expansion valve, a manufacturing method thereof and a thermal management assembly are provided herein, so as to be beneficial for simplifying the structure, achieving the convenience and simplicity of assembly, and ensuring the reliability of assembly.

An electronic expansion valve is provided and includes a valve body, a valve component, a control portion and a sensor. The valve body includes a first mounting portion and a second mounting portion, the valve body is provided with a first channel and a second channel, the first mounting portion is provided with a first cavity, the second mounting portion is provided with a second cavity, the first cavity is communicated with the first channel, and the second cavity is communicated with the second channel. The valve component includes a valve seat, a valve core and a rotor assembly, the valve seat is formed with a valve port. The rotor assembly is capable of driving the valve core to move relative to the valve seat, such that the valve core moves relative to the valve seat to adjust an opening degree of the valve port. At least part of the valve seat is located in the first cavity, and at least part of the sensor is located in the second cavity. The control portion includes a cover body, a stator assembly and an electric control board, the stator assembly is in electrical connection to, or is in signal connection to, or is in electrical connection to and in signal connection to the electric control board, and the sensor is in electrical connection to, or is in signal connection to, or is in electrical connection to and in signal connection to the electric control board; and the control portion is provided with a control cavity, at least part of the control cavity is formed by the cover body, the electric control board is disposed in the control cavity, part of the sensor is located in the control cavity, the control cavity is communicated with the second cavity, the sensor is securely connected to the valve body, and the sensor is configured to abut against the electric control board.

A thermal management assembly is provided and includes an electronic expansion valve and a heat exchanger. The electronic expansion valve is securely connected to the heat exchanger, and the electronic expansion valve is the electronic expansion valve described above. The electronic expansion valve includes a valve body. The valve body includes a first inlet, a second inlet, a first outlet and a second outlet, a first channel is configured to communicate the first outlet with the first inlet, a second channel is configured to communicate the second outlet with the second inlet, the first outlet is communicated with an inlet of the heat exchanger, the second inlet is communicated with an outlet of the heat exchanger, and the inlet of the heat exchanger is communicated with the outlet of the heat exchanger through a third channel of the heat exchanger.

An electronic expansion valve and a thermal management assembly are provided. The thermal management assembly includes the electronic expansion valve, and the electronic expansion valve includes a valve body, a valve component, a sensor, and a control portion. The sensor is integrated into the electronic expansion valve, the sensor is limited through the valve body, a mechanical connection portion for limiting the sensor is not needed to be separately configured, and thus the structure is simpler. Meanwhile, a pin of the sensor is used to be connected to the control portion, so a wire harness is not needed to be separately configured to transmit signals of the sensor to a controller.

A manufacturing method of an electronic expansion valve is provided. The electronic expansion is an electronic expansion valve as described above. The manufacturing method of an electronic expansion valve includes the following steps.
  assembling a control portion;
  securely connecting a valve component to a valve body;
  securely connecting a sensor to the valve body; and
  assembling the assembled control portion with the valve body, or with an assembly formed by securely connecting the valve component to the valve body and securely connecting the sensor to the valve body.

The manufacturing method of an electronic expansion valve includes securely connecting the valve component to the valve body, securely connecting the sensor to the valve body, and securely connecting the assembled control portion to the valve body. In the manufacturing method, the valve body is taken as a reference, the valve component, the sensor and the control portion are securely connected to the valve body, thus the manufacturing reference and the assembling reliability can be ensured, and positioning clamps and the assembly process of the electronic expansion valve can be simplified.

DETAILED DESCRIPTION

The present disclosure will be further described in detail with reference to the drawings and embodiments.

Figure 1:
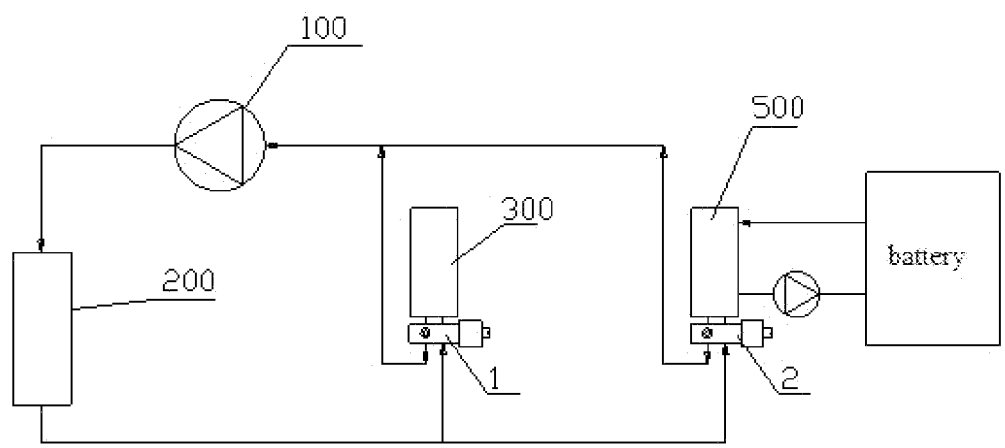
FIG. 1 is a block diagram of a refrigeration system according to an embodiment of the present disclosure.
Figure 2:
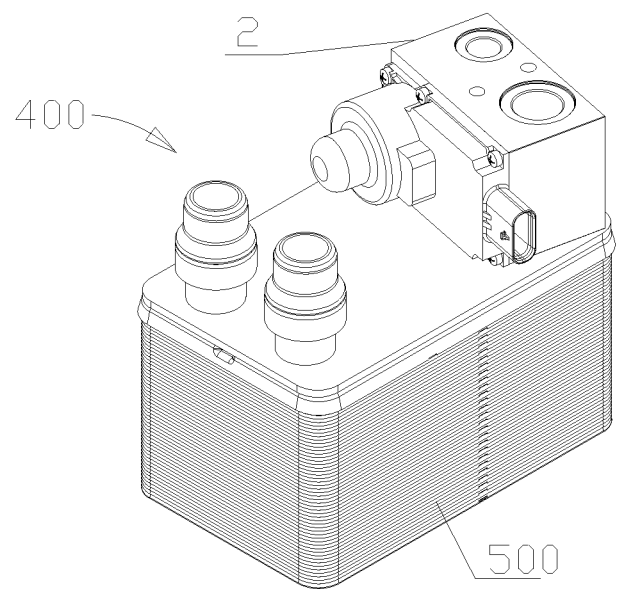
FIG. 2 is a structural view of a thermal management assembly according to an embodiment of the present disclosure.

FIG. 1 is a block diagram of a refrigeration system according to an embodiment. In this embodiment, the refrigeration system includes an air conditioning system and a battery cooling system. The air conditioning system includes a compressor 100, a condenser 200, a first electronic expansion valve 1 and an evaporator 300. In the case where the air conditioning system works, a refrigerant is compressed into a high-temperature and high-pressure refrigerant through the compressor 100, the high-temperature and high-pressure refrigerant is cooled through the condenser 200 to become a normal-temperature and high-pressure refrigerant, and the normal-temperature and high-pressure refrigerant enters the evaporator 300 through the first electronic expansion valve 1. Since the pressure of the normal-temperature and high-pressure refrigerant is reduced after the normal-temperature and high-pressure refrigerant passing through the first electronic expansion valve 1, the refrigerant is vaporized to become a low-temperature refrigerant, and the low-temperature refrigerant absorbs a large amount of heat through the evaporator 300 to become the refrigerant and returns to the compressor 100. The battery cooling system includes a thermal management assembly in which a refrigerant in the air conditioning system exchanges heat with a working medium of the battery cooling system. FIG. 2 is a structural view of a thermal management assembly according to an embodiment. In this embodiment, the thermal management assembly 400 includes a heat exchanger 500 and a second electronic expansion valve 2. The heat exchanger 500 and the second electronic expansion valve 2 are integrated as a whole, and a refrigerant in an air conditioning system exchanges heat with a working medium of a battery cooling system in the heat exchanger 500. In this embodiment, the structure of the first electronic expansion valve 1 and the structure of the second electronic expansion valve 2 are the same. Hereinafter, the first electronic expansion valve 1 and the second electronic expansion valve 2 will be described collectively as an electronic expansion valve. Of course, the structure of the first electronic expansion valve may also be different from the structure of the second electronic expansion valve, or the battery cooling system does not use the electronic expansion valve. One of the first electronic expansion valve or the second electronic expansion valve and the electronic expansion valve of the solution have the same structure, and are both within the scope of the solution.

With reference to FIGS. 3 to 6, in some embodiments, the electronic expansion valve 1 includes a control portion 10, a valve body 20, a valve component 40 and a sensor 50. The valve component 40 is securely connected to the valve body 20, the sensor 50 is in electrical connection to the control portion 10, the sensor 50 is securely connected to the valve body 20, and the control portion 10 is securely connected to the valve body 20. In this embodiment, the control portion 10 and the valve body 20 are securely connected through a screw 70, and may also be securely connected by means of snapping or bonding. In this way, the sensor 50 is integrated into the electronic expansion valve 1, the sensor 50 is limited through the valve body 20, a mechanical connection portion for limiting the sensor is not needed to be separately configured, and thus the structure is simpler. Meanwhile, a pin of the sensor is used to be connected to the control portion 10, so a wire harness is not needed to be separately configured to transmit signals of the sensor to a controller. The electronic expansion valve further includes a first sealing element 60, and the first sealing element 60 is disposed between the control portion 10 and the valve body 20 so as to enhance the sealing between the control portion 10 and the valve body 20. The electronic expansion valve further includes a first groove 103, the first groove 103 is disposed at the control portion 10 or the valve body 20, the first sealing element 60 is received in the first groove 103, and the first groove 103 is configured to position or limit the first sealing element.

Figure 3:
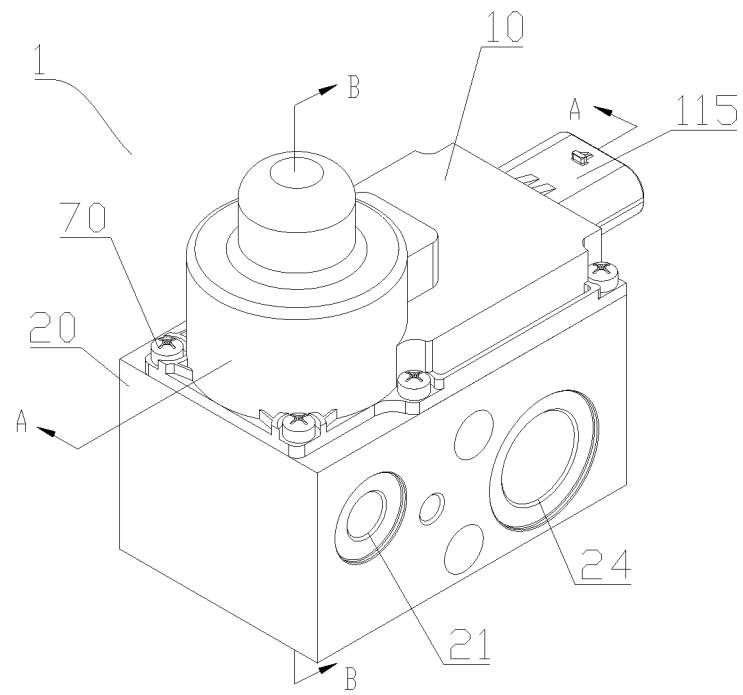
FIG. 3 is a perspective view of an electronic expansion valve in a direction according to a solution of the present disclosure.
Figure 4:
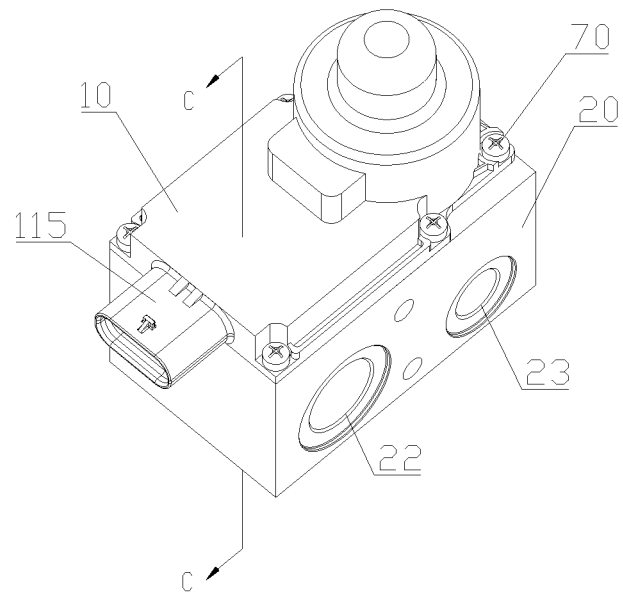
FIG. 4 is a perspective view of the electronic expansion valve in another direction according to the solution of the present disclosure.
Figure 5:
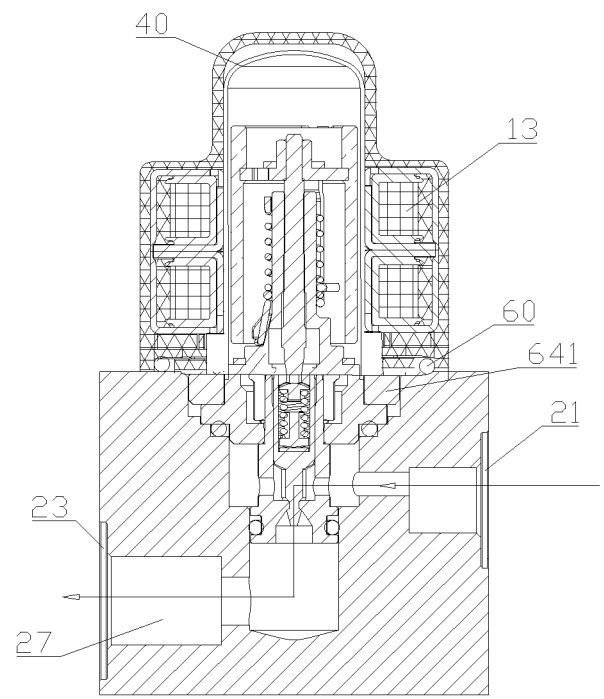
FIG. 5 is a sectional view of the electronic expansion valve of FIG. 3 taken along a B-B direction.
Figure 6:
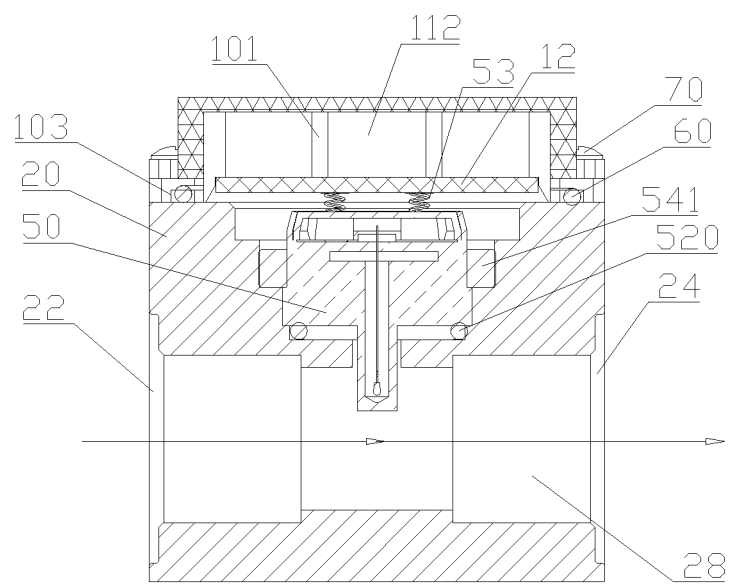
FIG. 6 is a sectional view of the electronic expansion valve of FIG. 4 taken along a C-C direction.

With reference to FIGS. 5 to 6, in some embodiments, the valve body 20 includes a first inlet 21, a first outlet 23 and a first channel 27, and the first inlet 21 and the first outlet 23 can be communicated through the first channel 27. The valve body 20 further includes a second inlet 22, a second outlet 24 and a second channel 28, and the second inlet 22 and the second outlet 24 can be communicated through the second channel 28. The first channel 27 is not communicated with the second channel 28. With reference to FIG. 3 and FIG. 4, the first inlet 21 and the second outlet 24 are disposed on one same side of the valve body 20, and the second inlet 22 and the first outlet 23 are disposed on another same side of the valve body 20, so that in the case where the electronic expansion valve and the heat exchanger are integrated or assembled, the first outlet 23 of the electronic expansion valve is connected to an inlet of the heat exchanger 500, and an outlet of the heat exchanger is connected to the second inlet 22 of the electronic expansion valve, facilitating the corresponding mounting of the heat exchanger and the electronic expansion valve. In addition, the first inlet 21, the second inlet 22, the first outlet 23 and the second outlet 24 may be disposed on a same side of the valve body 20, or on different sides of the valve body 20, and may be designed according to the requirement of the electronic expansion valve in practical application. In the solution, according to the flow direction of the working medium, the first outlet is located upstream of the inlet of the heat exchanger and the second inlet is located downstream of the outlet of the heat exchanger.

Figure 9:
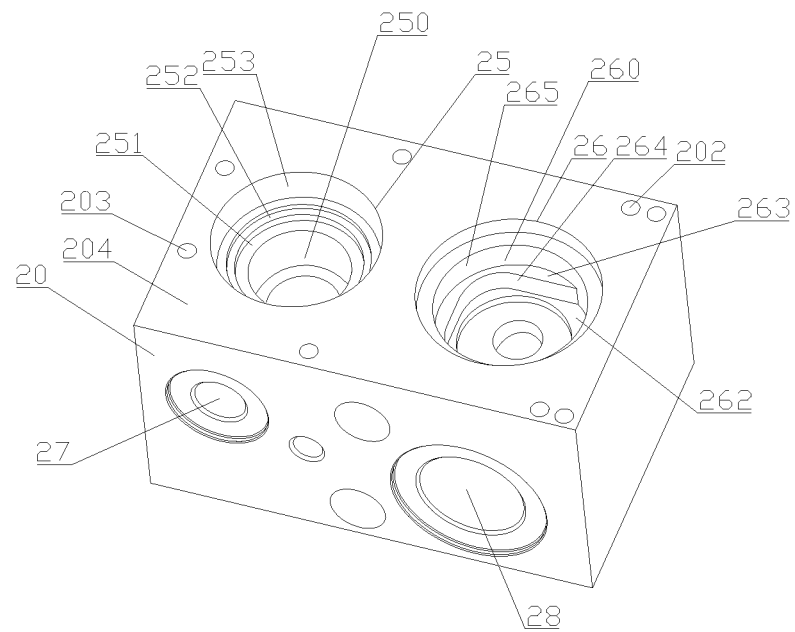
FIG. 9 is a structural view of a valve body of FIG. 3.
Figure 10:
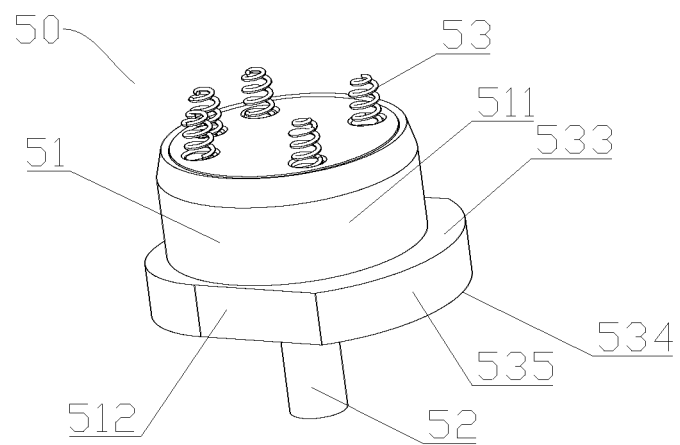
FIG. 10 is a structural view of a sensor of FIG. 6.

With reference to FIG. 9, in some embodiments, the valve body 20 further includes a first mounting portion 25 and a second mounting portion 26, the first mounting portion 25 is provided with a first cavity 250, the second mounting portion 26 is provided with a second cavity 260, the first cavity 250 can be communicated with the first channel 27, and the second cavity 260 is communicated with the second channel 28. The valve body 20 includes a first side wall 204, an opening of the first cavity 250 and an opening of the second cavity 260 are both formed on the first side wall 204, or in other words, the first side wall is formed with the first cavity 250 and the second cavity 260, or in other words, the opening of the first cavity and the opening of the second cavity are located on the first side wall, or in other words, the opening of the first cavity and the opening of the second cavity are located on a same side of the valve body. In this way, in the embodiment, the first inlet 21 and the second outlet 24 are located on a same side of the valve body 20, the second inlet 22 and the first outlet 23 are located on a same side of the valve body 20, the opening of the first cavity 250 and the opening of the second cavity 260 are located on a same side of the valve body 20, and the three sides are different sides of the valve body, so that interference is avoided, miniaturization of the valve body is facilitated, and utilization rate of the valve body is improved.

Figure 7:
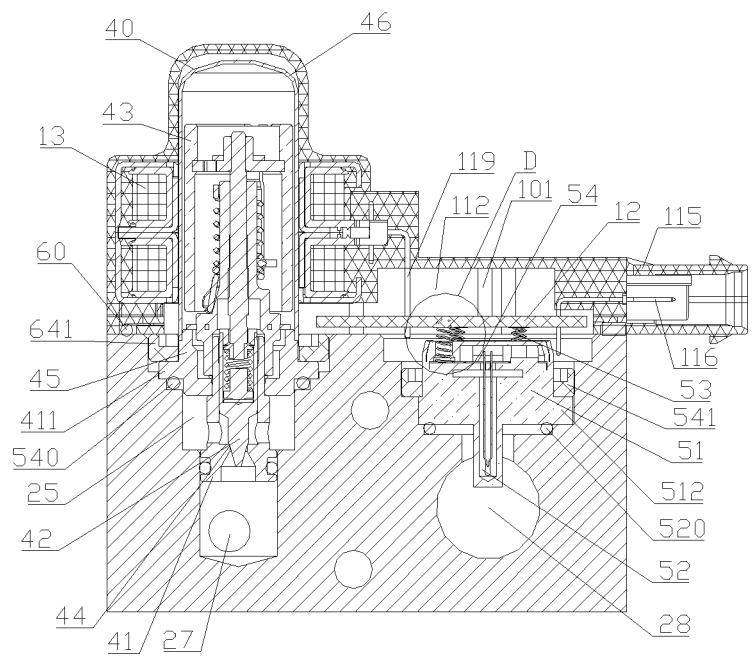
FIG. 7 is a cross-sectional view of the electronic expansion valve of FIG. 3 taken along an A-A direction.

With reference to FIG. 7, in some embodiments, the valve component 40 includes a valve seat 41, a valve core 42, and a rotor assembly 43. The rotor assembly 43 can drive the valve core 42 to move to enable the valve core 42 to move relative to the valve seat 41. The valve seat 41 is provided with a valve port 44, and the valve port 44 communicates the first channel 27 located on two sides of the valve port 44. The valve core 42, by being adjacent to and away from the valve port 44, changes the flow cross-sectional area of the first channel at the valve port 44, and thus throttling can be achieved at the valve port 44.

In this embodiment, the valve component 40 further includes a connecting element 45 and a sleeve 46. The sleeve 46 covers an outer periphery of the rotor assembly 43, the sleeve 46 is securely welded with the connecting element 45, the valve seat 41 is securely connected to the connecting element 45, that is, the sleeve 46 is connected to the valve seat 41 through the connecting element 45, so that the simplification of the mold is facilitated, the mold is miniaturized, and the forming processing of the valve seat is facilitated. Of course, the connecting element 45 may also be integrally formed with the valve seat 41, so that the connection between the connecting element 45 and the valve seat 41 is not needed to be configured.

In this embodiment, the connecting element 45 is formed with a flange portion 411. The flange portion 411 includes two surfaces, i.e., a lower end surface 413 of the flange portion and an upper end surface 412 of the flange portion, respectively. The upper end surface 412 of the flange portion faces towards a side where the sleeve 46 is located, and the lower end surface 413 of the flange portion faces towards a side where the valve body 20 is located.

At least part of the valve component 40 is received in the first cavity 250, and the valve component 40 is securely connected to the first mounting portion 25. In some embodiments, with reference to FIG. 9, the first mounting portion 25 includes a first stepped surface 252 and a first side portion 253. Along an axial direction of the first mounting portion 25, the first side portion 253 is disposed more adjacent to an outer side of the valve body than the first stepped surface 252, the first stepped surface 252 is substantially perpendicular to an axial direction of a main body portion of the first mounting portion 25, and the first side portion 253 is parallel to the axial direction of the main body portion of the first mounting portion 25. The main body portion of the first mounting portion 25 refers to the portion formed with the first cavity. The first side portion 253 is formed with a thread on a surface, and the thread formed on the surface of the first side portion 253 is defined as an internal thread.

Figure 12:
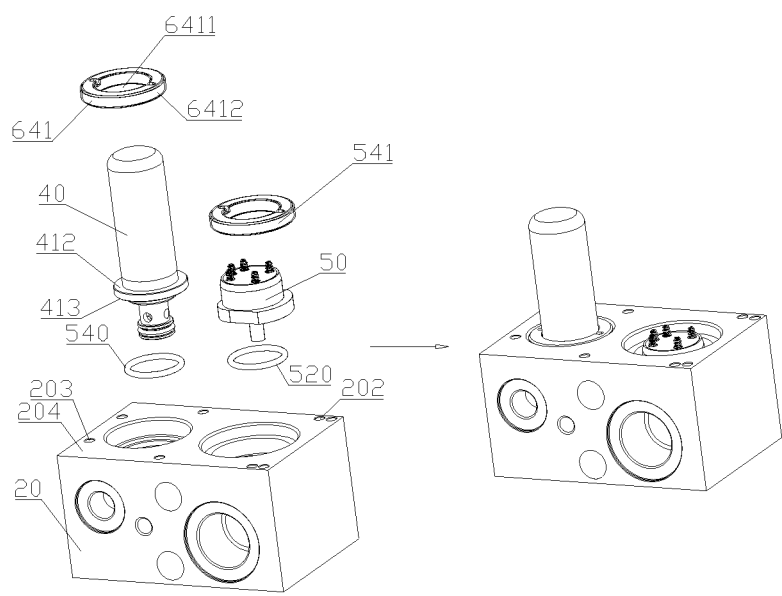
FIG. 12 is a view showing a second assembling step of an electronic expansion valve.

With reference to FIGS. 7, 9, and 12, in some embodiments, the lower end surface 413 of the flange portion abuts against the first stepped surface 252. By presetting the distance from the first stepped surface 252 to an outer side surface of the valve body 20 formed with the opening of the first cavity, the length of the valve seat 41 into the first cavity 250 can be controlled. The electronic expansion valve 1 further includes a second gland nut 641. The second gland nut 641 is provided with a first through hole 6411, an outer periphery of the second gland nut is formed with a thread, and the thread formed at the outer periphery of the second gland nut is defined as an external thread 6412, and the sleeve 46 passes through the first through hole 6411. The second gland nut 641 is disposed at an outer periphery of the connecting element 45, and the lower end surface of the second gland nut abuts against and the upper end surface 412 of the flange portion. The second gland nut 641 is rotated, the external thread of the second gland nut 641 acts with the internal thread of the first side portion 253, the second gland nut 641 compresses the flange portion 411 tightly against the valve body 20, and the valve component 40 is securely connected relative to the valve body 20, so that a relative position of the valve component 40 and the valve body 20 can be ensured not to change, and mounting is convenient and simple.

In some embodiments, the electronic expansion valve 1 further includes a second sealing element 540, and the first mounting portion 250 of the valve body 20 may further include a second stepped surface 251, the second stepped surface 251 is substantially parallel to the first stepped surface 252, and the second stepped surface 251 is disposed farther away from the first side wall 204 than the first stepped surface 252, that is, the second stepped surface 251 is disposed more adjacent to a bottom of the first cavity 250 than the first stepped surface 252. The second sealing element 540 is disposed between the second stepped surface 251 and the lower end surface 413 of the flange portion, and the distance between the first stepped surface 252 and the second stepped surface 251 may be set according to the size of the second sealing element 540 and the sealing requirement, so that the case of a poor sealing effect of the second sealing element 540 due to the fact that a compressing force acting on the second sealing element 540 is too large or too small can be avoided, the sealing between the first mounting portion 25 and the valve component 40 can be enhanced, the risk of leakage of the working medium is reduced, and the sealing performance of the electronic expansion valve is improved. Alternatively, the first stepped surface 252 is provided with a second groove, the second sealing element 540 is disposed in the second groove of the first stepped surface 252, the lower end surface 413 of the flange portion is in contact with the second sealing element 540 and compresses the second sealing element 540 tightly. The first stepped surface 252 is provided with the second groove, so that the mounting of the second sealing element 540 is facilitated, the sealing between the first mounting portion 25 and the valve seat 41 can also be enhanced, the risk of the leakage of working medium can also be reduced, and thereby the sealing performance of the electronic expansion valve is improved. It may be known that the second groove may also be disposed on a side portion of the flange portion, the depth of the second groove is less than the thickness of the second sealing element, and the second sealing element is compressed tightly between the valve component and the valve body.

With reference to FIGS. 7 to 11, in some embodiments, the control portion 10 includes a cover body 11, an electric control board 12, and a stator assembly 13. The electric control board 12 is in electrical connection to, or is in signal connection to, or is in electrical connection to and in signal connection to the stator assembly 13. The control portion 10 is provided with a control cavity 112, at least part of the control cavity 112 is formed by the cover body 11, the control cavity 112 is communicated with the second cavity, the electric control board 12 is mounted in the control cavity 112, and the electric control board 12 can output control signals to the stator assembly 13 or transmit control signals to the stator assembly 13. The cover body 11 and the stator assembly 13 are integrally injection-molded. In some embodiments, the stator assembly 13 includes a coil and a first insertion pin 119, and the stator assembly 13 is in electrical connection to, or is in signal connection to, or is in electrical connection to and in signal connection to the electric control board 12 through the first insertion pin 119. The cover body 11 is injection-molded and formed with the coil and the first insertion pin 119 as inserts, one end of the first insertion pin 119 is encapsulated in the cover body 11, the other end of the first insertion pin 119 is exposed out of the cover 11, and the other end of the first insertion pin 119 exposed out of the cover body 11 is securely plugged in, and can be in electrical connection to, or be in signal connection to, or be in electrical connection to and in signal connection to the electric control board 12. The control portion 10 further includes an interface portion 115, and the electronic expansion valve is in electrical connection to, or is in signal connection to, or is in electrical connection to and in signal connection to the outside through the interface portion 115. The interface portion 115 is securely connected to the cover body 11 through injection-molding, the interface portion 115 includes a second insertion pin 116, and the interface portion 115 is provided with a mounting cavity 1151. The second insertion pin 116 extends into the mounting cavity, and the second insertion pin 116 is securely connected to the cover body 11 through injection-molding. A first end of the second insertion pin 116 extends into the control cavity 112, a second end of the insertion pin 116 extends into the mounting cavity 1151, and at least part of the middle portion of the second insertion pin 116 is securely connected to the cover body 11 through injection-molding. The first end of the second insertion pin 116 is plugged in or crimped to and securely connected to the electric control board 12, the second end of the second insertion pin 116 extends into the mounting cavity 1151, and the electric control board 12 can be connected to at least one of a power supply or a control signal outside the electronic expansion valve through the second insertion pin 116. The electric control board 12 is provided with a first jack 122 and a second jack 125, the first insertion pin 119 is inserted into the first jack 122, and the second insertion pin 116 is inserted into the second jack 125. The first insertion pin 119 and the second insertion pin 116 may be connected to the electric control board 12 through welding or through crimping fit, and the electric control board 12 is securely connected relative to the cover body 11 through the first insertion pin 119 and the second insertion pin 116. The stator assembly 13 and the cover body 11 are integrally injection-molded and are assembled with the electric control board 12 to form a first portion of the control portion, and the stator assembly 13 is sleeved at the outer periphery of the rotor assembly 43.

With reference to FIGS. 7, 8, 11 and 14, in some embodiments, along the axial direction of the second mounting portion 26, an opening direction of the second cavity 260 is defined to be upper, and a direction opposite to the opening direction of the second cavity 260 is lower. An upper surface of the electric control board 12 is a first surface 123 of the electric control board, and the surface opposite to the first surface 123 of the electric control board is a second surface 124 of the electric control board, or in other words, along the axial direction of the second mounting portion 26, the second surface 124 of the electric control board is more adjacent to the first side wall 204 than the first surface 123 of the electric control board. It may be known that the electronic elements and devices of the electric control board 12 are disposed on the first surface of the electric control board or the second surface of the electric control board. Along the axial direction of the second mounting portion 26, at least part of the electric control board 12 is disposed between the second mounting portion 26 and the cover body 11; or in other words, the first surface 123 of the electric control board faces towards an inner wall 113 of part of the cover body, the second surface 124 of the electric control board faces towards the first side wall 204 provided with the second mounting portion 26 and the sensor 50; or in other words, the cover body 11 is not disposed between the electric control board 12 and the valve body 20, the electric control board 12 is securely mounted to the first insertion pin 119 and the second insertion pin 116, the electric control board 12 is placed into the control cavity 112 from a side of the cover body corresponding to the valve body 20, the electric control board 12 is crimped to the first insertion pin 119 and the second insertion pin 116, so the mounting of the electric control board 12 and the assembling of the electronic expansion valve are facilitated. In addition, the electric control board 12 and the stator assembly 13 are disposed on a same side of the first side wall 204, and thus the structure of the electronic expansion valve is relatively compact.

In the solution, the sensor 50 is securely connected to the valve body 20, an end of the sensor 50 is securely connected to the second mounting portion 26, and part of the sensor 50 extends into the second cavity 260.

In the solution, the sensor 50 includes a body 51, a sensing head 52 and a connecting portion 53. The sensing head 52 is securely connected to the body 51, the sensing head 52 is located in the second channel 28 or in the second cavity 260, and the sensing head 52 can sense a relevant parameter of the working medium in the second channel 28 or in the second cavity 260, where the relevant parameter is, for example, at least one of the temperature of the working medium or the pressure of the working medium. The electric control board 12 is in electrical connection to, or is in signal connection to, or is in electrical connection to and in signal connection to the sensor 50 through the connecting portion 53. One end of the connecting portion 53 is exposed out of a first end of the body, one end of the sensing head 52 is exposed out of a second end of the body 51, and the first end of the body 51 and the second end of the body are located at different ends of the body. Another end of the connecting portion 53 is encapsulated in the body 51 and is in electrical connection to, or is in signal connection to, or is in electrical connection to and in signal connection to the sensing head 52, and the one end of the connecting portion 53 is exposed out of the body 51 and is in electrical connection to, or is in signal connection to, or is in electrical connection to and in signal connection to the electric control board 12. Since the electric control board 12 is disposed in the control cavity 112, at least part of the connecting portion 53 is located in the control cavity 112.

Figure 8:
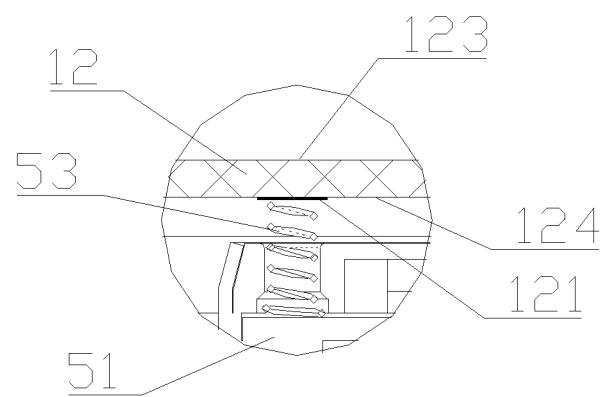
FIG. 8 is a partial enlarged view of part D of FIG. 7.

With reference to FIG. 8, the second surface 124 of the electric control board is provided with a first abutting portion 121. The first abutting portion 121 includes a conductive layer formed on the second surface 124 of the electric control board, the conductive layer may be a tin plating layer, be treated with electroless nickel plating and gold immersion, and the like, or be a conductive metal sheet securely connected to the electric control board. The first abutting portion 121 is in electrical connection to the circuit of the electric control board, the connecting portion 53 of the sensor abuts against and is in electrical connection to, or is in signal connection to, or is in electrical connection to and in signal connection to the first abutting portion 121, or the connecting portion 53 is securely connected to and is in electrical connection to, or is in signal connection to, or is in electrical connection to and in signal connection to the first abutting portion. The sensor 50 set in this way abuts against the electric control board 12 through the first abutting portion 121, so the wire layout can be reduced relatively, a plugging hole does not need to be disposed on the electric control board 12, disposing electronic elements and devices on the first surface of the electric control board can be facilitated, utilization rate of the first surface of the electric control board is improved, welding is not needed, and the assembly process becomes simpler.

Specifically, in this embodiment, the sensor includes five connecting portions 53, so the connection reliability between the connecting portions and the electronic control board can be improved. The sensor 50 further includes a conducting plate 54, the conducting plate 54 is made of a conductive material, and the conducting plate 54 is encapsulated in the body 51. First ends of the connecting portions 53 are securely connected to the conducting plate 54, where the secured connection includes surface-to-surface contact welding, welding after plugging, or interference plugging securing and electrical connection, or signal connection, or electrical connection and signal connection. The sensing head 52 is securely connected by welding to or is plugged in the conducting plate 54, and the connecting portions 53 are in electrical connection to, or are in signal connection to, or are in electrical connection to and in signal connection to the sensing head 52 through the conducting plate 54, so that the support to the connecting portion and the sensing head are provided by the conducting plate. Of course, the positions of the connecting portion and the conducting plate may also be limited by the body, that is, the connecting portion is in contact with and is in electrical connection to, or is in signal connection to, or is in electrical connection to and in signal connection to the conducting plate, and the connecting portion is securely connected to the conducting plate through the body. The positions of the conducting plate and the sensing head are limited by the body, that is, the conducting plate is in electrical connection to, or is in signal connection to, or is in electrical connection to and in signal connection to the sensing head, and the conducting plate is securely connected to the sensing head through the body. Of course, if the sensor merely includes one connecting portion, the conducting plate may not be configured, the connecting portion is in electrical connection to, or is in signal connection to, or is in electrical connection to and in signal connection to the sensing head, and the connecting portion is securely connected to the sensing head or the connecting portion is securely connected to the sensing head through the body; in this way, the structure of the sensor is simpler.

In the embodiment, the connecting portion 53 is a resilient element, such as a spring, a resilient element or a leaf spring, etc. In the embodiment, the spring is used as the connecting portion 53 for explanation. After the connecting portion 53 is secured, the connecting portion 53 is compressed and deformed by the electric control board 12 and the conducting plate 54, and the connecting portion 53 is resiliently deformed, or in other words, the length of the resilient element between the electric control board and the sensor is less than the length of the resilient element in a natural state, so the contact between the connecting portion 53 and the electric control board 12 is more reliable. The body is formed with an accommodating cavity, one part of the connecting portion is accommodated in the accommodating cavity, another part of the connecting portion is exposed out of the body, one end of the connecting portion 53 exposed out of the body abuts against the conductive layer of the electric control board 12, the opposite end of the connecting portion abuts against the conducting plate of the sensor or the sensing head of the sensor, and thus welding is relatively reduced and the assembly process is simplified. The connecting portion 53 abuts against the electric control board 12, and the electric control board 12 is deformed. To eliminate the acting force of the connecting portion 53 on the electric control board 12 and enhance the stability of the electric control board 12, the cover body 11 is provided with a support portion 101, the support portion 101 protrudes relatively from the inner wall 113 of the cover body and protrudes towards the electric control board 12. Along the axial direction of the second mounting portion 26, the support portion 101 is disposed above the electric control board 12. The support portion 101 is substantially perpendicular to the first surface 123 of the electronic control board, the support portion 101 is in contact with the first surface 123 of the electric control board, the support portion 101 and the connecting portion 53 are respectively disposed on two sides of the electric control board 12, and the support portion 101 is used for counteracting the resilient force exerted by the connecting portion 53 on the electric control board 12. In the embodiment, the electric control board 12 includes five first abutting portions 121, the cover body 11 includes two support portions 101, and the first abutting portions 121 surround and form a first region, the support portions 101 provides support at a position adjacent to the center of the first region, thus facilitating the relative stability of the electric control board 12.

In some embodiments, the body 51 further includes a limit portion 512, the limit portion is a non-rotating body, the limit portion 512 includes a limit surface 535, and the limit surface 535 is distributed along the circumferential direction of the limit portion 512. Correspondingly, the second mounting portion 26 includes a cooperating portion 264, the cooperating portion 264 includes a cooperating surface, and the cooperating surface is formed on a side wall of the second mounting portion. After the sensor is assembled with the valve body, the cooperating surface mates with and abuts against the limit surface, the rotation of the sensor relative to the valve body is limited, the position of the sensor relative to the valve body is ensured, and the position of the sensor relative to the electric control board is further ensured. Specifically, with reference to FIGS. 9 and 10, the body 51 further includes a main body portion 511, and the conducting plate 54 is securely connected to the main body portion 511. In this embodiment, at least part of the limit portion 512 protrudes from an outer edge of the main body portion 511. Along the axial direction of the second mounting portion 26, the main body portion 511 is more adjacent to the electric control board 12 than the limit portion 512. The electronic expansion valve further includes a first gland nut. The first gland nut is compressed against the part of the limit portion 512 protruding from the main body portion. In some embodiments, the limit portion 512 includes a limit surface 535, a lower end surface 534 of the limit portion and an upper end surface 533 of the limit portion. The limit surface 535 is distributed along the circumferential direction of the limit portion 512. Along the axial direction of the sensor, the lower end surface 534 of the limit portion is located on one side of the limit portion 512, and the upper end surface 533 of the limit portion is located on the other side of the limit portion 512. The limit surface 535 includes a curved surface and a flat surface, and it may be known that in a case where the limit portion 512 is located in the second cavity 260, the sensor cannot rotate since the limit portion is a non-rotating body. The structures of the limit portion may be various as long as the sensor can be prevented from rotating, for example, the limit portion is square, oval or in other shapes. The second mounting portion 26 includes a third stepped surface 263, an abutting surface 262, and a second side portion 265. Along the axial direction of the second mounting portion 26, the cooperating surface is located between the third stepped surface 263 and the abutting surface 262, the third stepped surface 263 is more adjacent to the first side wall 204 than the abutting surface 262, and the second side portion 265 is more adjacent to the first side wall 204 than the third stepped surface 263. The third stepped surface 263 and the abutting surface 262 are substantially perpendicular to the axial direction of the second mounting portion 26, and the cooperating surface and the second side portion are substantially perpendicular to the axis of the second mounting portion 26. The second side portion 265 is provided with an internal thread, and the lower end surface 534 of the limit portion abuts against the abutting surface 262, so the length of the sensor 50 entering the second cavity 260 can be controlled. The electronic expansion valve includes the first gland nut 541, the first gland nut 541 is sleeved on the main body portion 511, and the lower end surface of the first gland nut abuts against the upper end surface of the limit portion. An outer periphery of the first gland nut is formed with a thread, the second mounting portion includes a threaded portion, and the threaded portion is disposed farther away from the bottom of the second mounting portion than the cooperating portion. Under the action of the thread of the outer periphery of the first gland nut 541 and the threaded portion of the second side portion 265 of the second mounting portion, the first gland nut 541 compresses the limit portion 512 tightly, thereby connecting the sensor 50 and the valve body 20.

In this embodiment, the electronic expansion valve further includes a third sealing element 520. The third sealing element is disposed between the bottom of the second mounting portion and the sensor, the third sealing element is configured to form a sealing structure between the sensor and the valve body, so as to prevent the working medium in the second channel from entering the control cavity through a gap between the sensor and the valve body. The third sealing element 520 is disposed at the bottom of the second mounting portion and to limit the position by forming a cooperating surface. The distance from the abutting surface to the bottom of the second mounting portion is less than the thickness of the third sealing element. The lower end surface 534 of the limit portion is in contact with the third sealing element 520 to tightly compress the third sealing element 520 against the bottom of the second mounting portion. By setting the distance between the abutting surface and the bottom of the second mounting portion, the compression amount of the third sealing element is controlled, facilitating avoidance of the case of a poor sealing effect of the third sealing element 520 due to a fact that the compressing force on the third sealing element 520 is too large or too small, so the sealing between the second mounting portion 26 and the sensor 50 can be enhanced, the risk of the leakage of the working medium to the control cavity is reduced, the sealing performance of the electronic expansion valve is improved, and the risk of internal leakage is reduced. It may be known that the third sealing element may also be disposed between the limit surface and the valve body, that is, a third groove is disposed on the limit surface or on the valve body, the third sealing element is engaged in the third groove, and the limit surface not provided with the third groove or the valve body not provided with the third groove compresses the third sealing portion tightly. Alternatively, the lower end surface of the limit portion of the sensor is formed with a third groove or a stepped portion; or, the abutting surface of the second mounting portion is formed with a third groove, the third sealing element is engaged in the third groove, the depth of the third groove is less than the thickness of the third sealing element, and the third sealing element is compressed tightly between the lower end surface of the limiting portion of the sensor and the valve body.

Figure 11:
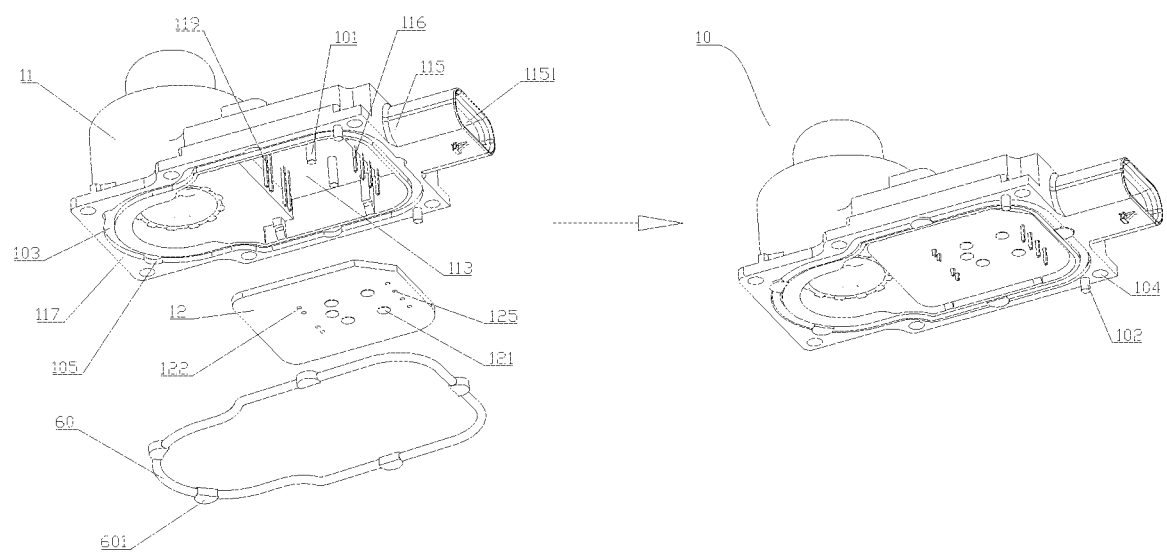
FIG. 11 is a view showing a first assembling step of an electronic expansion valve.

In this embodiment, with reference FIG. 11, the cover body 11 further includes a first ring portion 117, the first ring portion 117 is formed adjacent to an outer edge of the cover body 11 of the control portion, or in other words, the first ring portion 117 surrounds an outer periphery of the control cavity. In one embodiment described herein after the cover body is assembled with the valve body, the first ring portion 117 abuts against the first side wall 204 of the valve body. The electronic expansion valve further includes the first sealing element 60, the first sealing element is disposed around the outer periphery of the control cavity, and the first sealing element 60 is disposed between the first side wall 204 and the first ring portion 117. Further, the cover body 11 compresses the first sealing element 60 tightly against the valve body 20, thereby enhancing the sealing between the cover body 11 and the valve body 20 and avoiding the working medium from leaking to the outside of the electronic expansion valve through the connecting portion of the cover body and the valve body, or avoiding the external medium from entering the inside of the electronic expansion valve through the connecting portion of the cover body and the valve body, so that the external sealing of the electronic expansion valve is improved. In one embodiment described herein, the first ring portion 117 is disposed adjacent to a peripheral side of the cover body 11. In some embodiments, with reference to FIG. 7, along the axial direction of the second mounting portion 26, a first projection, a second projection and a third projection can be formed by projecting the opening of the first cavity 250, the opening of the second cavity 260 and the first ring portion 117 towards a plane perpendicular to the axis, a second projection and a third projection. The first projection and the second projection are located in the region enclosed by the third projection, that is, the first sealing element is located at the periphery of the opening of the first cavity and the opening of the second cavity, so that after the first ring portion is securely connected relative to the valve body, the external working medium can be prevented from entering the control cavity. In another embodiment, with reference to FIG. 14, to prevent the external medium from entering the control cavity and causing damage to the electric control board, in this embodiment, along the axial direction of the second mounting portion 26, the first sealing element 60 is disposed around the opening of the second cavity 260, and after the first ring portion is connected to the valve body, the cover body compresses the first sealing element tightly against the valve body, so that after the first ring portion is securely connected relative to the valve body, the sealing of the control cavity can be achieved. Part of the first sealing element is disposed between the opening of the first cavity and the opening of the second cavity, and the working medium entering the first cavity can be prevented from entering the control cavity. The first sealing element is not disposed at the outer periphery of the opening of the first cavity, thus facilitating the miniaturization of the first sealing element. The first insertion pin 119 and the second contract pin 116 are integrally injection-molded with the cover body 11. When the electric control board 12 is assembled, the electric control board 12 is compressed against the first insertion pin 119 and the second insertion pin 116, and the electric control board 12 is securely connected to the first insertion pin 119 and the second insertion pin 116 by crimping or welding. The opening of the control cavity of the cover body faces towards the valve body, the electric control board is disposed in the control cavity from the opening of the control cavity of the cover body, and the cover body 11 and the stator assembly are integrally formed. Of course, the cover body 11 further includes a first housing and a second housing, the first housing is separately formed, and the second housing and the stator assembly are integrally formed. In this way, the opening of the control cavity faces away from the valve body, the electric control board is disposed in the control cavity from the opening of the control cavity and is securely connected to the first insertion pin and the second insertion pin, and then the first housing and the second housing are sealingly securely, such as by means of laser welding. The second housing includes a first ring portion, the second housing is formed with a first communication hole, the first ring portion surrounds an outer periphery of the first communication hole, the first sealing element surrounds the outer periphery of the first communication hole, and the second housing compresses the first sealing element tightly against the valve body.

In the embodiment, the electronic expansion valve further includes a first groove 103, and the first groove 103 may be disposed on the first ring portion 117. The first groove 103 may also be disposed in the valve body 20, that is, a wall of the first groove is part of the first side wall 204, or in other words, the first side wall 204 includes the wall of the first groove, and the first groove 103 is disposed opposite the first ring portion 117. The first sealing element 60 is disposed in the first groove 103, the depth of the first groove is less than the height of the first sealing element, and when the cover 11 is securely connected to the valve body 20, the first sealing element 60 is compressed to achieve the sealing between the valve body 20 and the cover body 11. In addition, with reference to FIG. 11, the electronic expansion valve may further include at least one engaging groove 105, each engaging groove is co-located with the first groove 103 on the valve body or the first ring portion of the cover body, and each engaging groove 105 is communicated with the first groove 103. Accordingly, the first sealing element 60 further includes at least one protrusion 601, and each protrusion 601 of the first sealing element is in interference fit with a corresponding engaging groove 105. In a case where the first groove 103 is disposed on the first ring portion 117 of the cover body 11, the first sealing element 60 can be prevented from falling off when the control portion 10 is assembled with the valve body 20, so the mounting is convenient.

Figure 13:
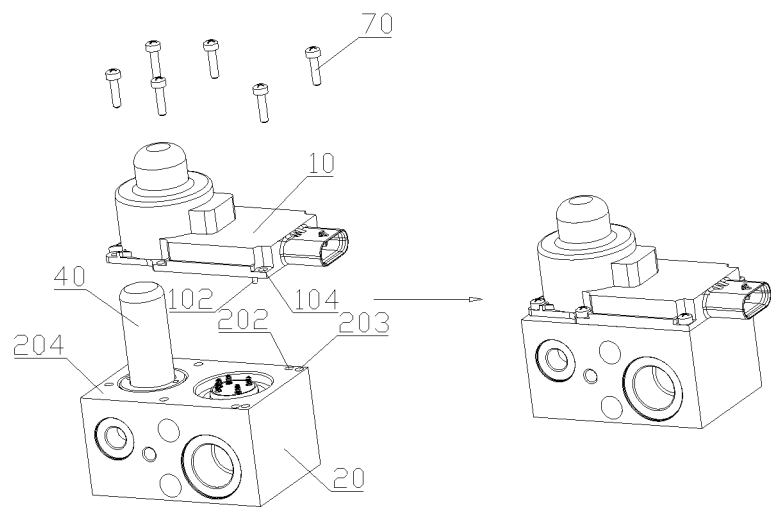
FIG. 13 is a view showing a third assembling step of an electronic expansion valve.
Figure 14:
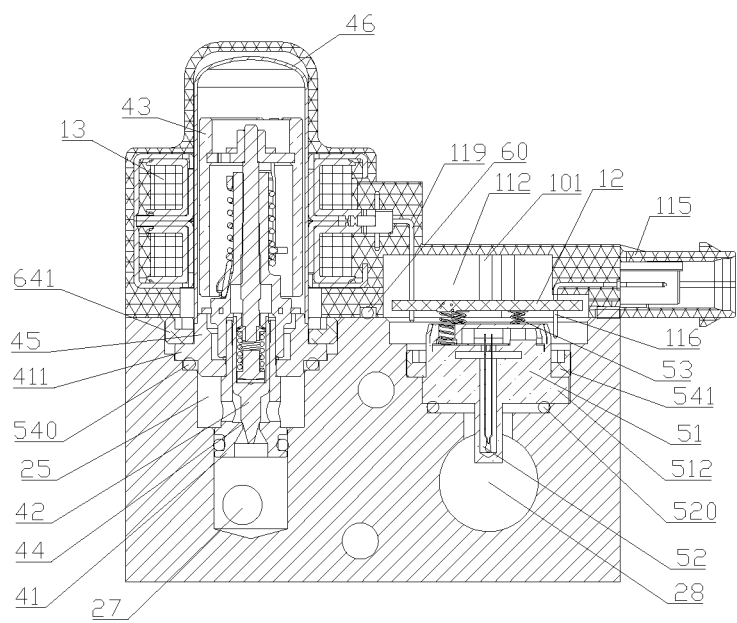
FIG. 14 is a cross-sectional view of an electronic expansion valve according to another embodiment of the present disclosure.

With reference to FIGS. 11 and 13, in some embodiments, the cover body 11 further includes limit bolts 102, and two or more limit bolts are provided. In this embodiment, the cover body includes two limit bolts 102, each limit bolt 102 is securely connected to the first ring portion 117, each limit bolt 102 protrudes towards the valve body 20 relative to the first ring portion 117, and each limit bolt 102 is disposed adjacent to the outer edge of the first ring portion 117, or each limit bolt is located on the outer side of the first groove. The valve body 20 includes positioning holes 202, the number of positioning holes 202 is the same as the number of limit bolts 102, and each of the limit bolts 102 is inserted into a respective one of the positioning holes 202 to limit the relative position of the control portion 10 and the valve body 20, so the offset of the control portion 10 relative to the valve body 20 can be prevented, and the secured connection between the control portion 10 and the valve body 20 is accurate and the assembly is convenient. It may be known that the limit bolts may also be disposed on the valve body, and correspondingly the positioning holes are disposed on the cover body.

In some embodiments, the electronic expansion valve further includes a fastening device 70, and the fastening device 70 may be a bolt or a screw. The cover body 11 includes second communication holes 104, the second communication holes 104 are disposed adjacent to the outer edge of the first ring portion 117, that is, the second communication holes 104 penetrate through the first ring portion 117. The valve body 20 includes threaded holes 203, and the fastening device 70 passes through the second communication hole 104 and the threaded hole 203 to securely connect the control portion 10 and the valve body 20. In the embodiment, two or more second communication holes are provided, and the number of threaded holes is the same as the number of second communication holes, so that the first sealing element 60 is compressed tightly, the control portion 10 and the valve body 20 can be integrated as a whole, the sealing performance, waterproof and dustproof performance between the valve body 20 and the control portion 10 can be improved, the intrusion of the external water or dust and the leakage of the internal working medium can be effectively prevented, and the effect of overall sealing can be achieved.

With reference to FIGS. 11 to 13, a manufacturing method of an electronic expansion valve is further provided herein. The electronic expansion valve includes a control portion, a valve body, a valve component and a sensor. The control portion includes a cover body, a stator assembly and an electric control board, and the cover body and the stator assembly are integrally injection-molded. The manufacturing method of the electronic expansion valve includes the steps described below.

In a1, the control portion is assembled. Step a1 includes:
 forming of the first portion of the control portion, that is, injection-molding and forming the first portion including the cover body with the stator assembly, a first insertion pin and a second insertion pin as inserts; and
 assembling of the electric control board with the first portion, that is, securely connecting the electric control board to the first insertion pin and the second insertion pin.

In a2, the valve component is securely connected to the valve body.

In a3, the sensor is securely connected to the valve body.

In a4, the control portion formed in the step a1 is assembled with assemblies formed in the step a2 and the step a3.

The sequence of steps a1, a2, and a3 described above is adjustable, and a4 follows steps a1, a2, and a3. Before the step a2, the assembling of the valve component is included. The valve component includes a valve seat, a valve core, a sleeve, a connecting element and a rotor assembly. The rotor assembly and the valve core are assembled and disposed on an inner side of the sleeve, the sleeve is securely welded with the connecting element, and the valve seat is securely welded with the connecting element.

Before the step a3, the forming of the sensor is included. The sensor includes a connecting portion, a conducting plate, a body and a sensing head. The connecting portion includes a resilient element, the resilient element is in contact with the conducting plate, the sensing head is in contact with the conducting plate, and the sensor including the body is injection-molded and formed with the resilient element, the conducting plate and the sensing head as inserts. The step a2 includes the following steps: a second sealing element is placed in a first cavity, the valve component is placed in the first cavity, and securely the valve component and the valve body are securely connected through a second gland nut.

The step a3 further includes the following steps: a third sealing element is placed in a second cavity, a limit portion of the sensor and a cooperating portion of the valve body are limited, the sensor is placed in the second cavity of the valve body, and securely the sensor and the valve body are securely connected through a first gland nut.

The Step a4 further includes the following steps: the first sealing element is placed in a first groove, a limit bolt is inserted into a positioning hole of the valve body, and securely the control portion and the valve body are securely connected through a fastening device.

The step a4 includes the following steps: the sensor is in electrical connection to, or in signal connection to, or in electrical connection to and in signal connection to the electric control board, the connecting portion of the sensor abuts against a first abutting portion of the electric control board, and the electric control board compresses the resilient element of the connecting portion to deform the resilient element by a set length.

The electronic expansion valve includes the control portion, the valve body, the valve component and the sensor. The control portion includes the cover body, the stator assembly and the electric control board. The cover body includes a first housing and a second housing, the second housing and the stator assembly are integrally formed, and a control cavity is formed between the first housing and the second housing. The manufacturing method of the electronic expansion valve includes steps described below.

In a1, the control portion is assembled. Step a1 includes:
forming of the first portion of the control portion, that is, injection-molding and forming the first portion including the second housing with the stator assembly, the first insertion pin and the second insertion pin as inserts;
assembling of the electric control board with the first portion, that is, securely connecting the electric control board to the first insertion pin and the second insertion pin; and
securely connecting the first housing to the second housing.

In a2, securely the valve component is securely connected to the valve body.

In a3, securely the sensor is securely connected to the valve body.

In a4, the control portion formed in the step a1 is assembled with the valve body.

For the electronic expansion valve thus manufactured, the assembly process design has a great degree of freedom since the assembly steps of the valve component and the sensor are not limited.

In the embodiment of the present disclosure, a thermal management assembly includes an electronic expansion valve, the electronic expansion valve includes a valve body, a sensor and a control portion, and the control portion includes an electric control board. The sensor is securely connected to the valve body, and the sensor is in electrical connection to, or is in signal connection to, or is in electrical connection to and in signal connection to, and abuts against the control portion, compared with insertion pin welding, facilitating relief of the stress. The sensor directly abuts against the control portion without wire harnesses, facilitating the integration of the refrigeration system. The sensor is directly and securely connected to the valve body, facilitating the simplification of the structure and making the structure compact.

In the embodiment of the present disclosure, the thermal management assembly includes the electronic expansion valve, and the electronic expansion valve includes the valve body, the valve component, the sensor, the control portion and the first sealing element. The first sealing element is disposed at the outer periphery of the second cavity, and the first sealing element is compressed tightly between the cover body and the valve body. In order to prevent the external media such as water from entering the control cavity and impacting the working performance of the circuit board, the first sealing element is disposed at the outer periphery of the control cavity, facilitating improvement of the sealing performance of the control cavity where the electric control board of the electronic expansion valve is located.

The manufacturing method of the electronic expansion valve provided herein includes securely connecting the valve component to the valve body, securely connecting the sensor to the valve body, and connecting the formed control portion to the valve body. In the manufacturing method, the valve body is taken as a reference, the valve component, the sensor and the control portion are securely connected to the valve body, and thus the manufacturing reference and the assembling reliability can be ensured and positioning clamps and the assembly process of the electronic expansion valve can be simplified.

What is claimed is:

1. An electronic expansion valve, comprising a valve body, a valve component, a control portion and a sensor,
    wherein the valve body comprises a first mounting portion and a second mounting portion, and the valve body is provided with a first channel and a second channel, wherein the first mounting portion is provided with a first cavity, the second mounting portion is provided with a second cavity, the first cavity is communicated with the first channel, and the second cavity is communicated with the second channel;
    wherein the valve component comprises a valve seat, a valve core and a rotor assembly, wherein the valve seat is formed with a valve port, the rotor assembly is capable of driving the valve core to move relative to the valve seat so as to adjust an opening degree of the valve port; at least part of the valve seat is located in the first cavity, and at least part of the sensor is located in the second cavity;

wherein the control portion comprises a cover body, a stator assembly and an electric control board, wherein the stator assembly is in electrical connection to, or is in signal connection to, or is in electrical connection to and in signal connection to the electric control board, and the sensor is in electrical connection to, or is in signal connection to, or is in electrical connection to and in signal connection to the electric control board;

wherein the control portion is provided with a control cavity, wherein at least part of the control cavity is formed by the cover body, the electric control board is disposed in the control cavity, part of the sensor is located in the control cavity, the control cavity is communicated with the second cavity;

wherein the sensor is securely connected to the valve body, and the sensor is configured to abut against the electric control board;

wherein the first channel is not communicated with the second channel, an opening of the first cavity and an opening of the second cavity are located on a same side of the valve body, wherein the control portion further comprises an interface portion, wherein the interface portion is securely connected to the cover body through injection molding, the interface portion is configured to enable the electronic expansion valve to be in electrical connection to, or be in signal connection to, or be in electrical connection to and in signal connection to an outside, the electronic expansion valve comprises a first sealing element, wherein the first sealing element is disposed around an outer periphery of the control cavity, and the first sealing element is compressed tightly between the cover body and the valve body; and wherein the electronic expansion valve further comprises at least one engaging groove, and corresponding the first sealing element comprises at least one protrusion, each of the at least one protrusion of the first sealing element is in interference fit with a corresponding one of the at least one engaging groove.

2. The electronic expansion valve according to claim 1, wherein the electric control board comprises a first surface and a second surface, wherein the first surface is disposed opposite to the second surface, the second surface is configured to face towards the valve body, and the electric control board comprises a first abutting portion, wherein the first abutting portion is formed on the second surface or the first abutting portion is securely connected to the second surface, the sensor is in contact with the first abutting portion, and the first abutting portion is in electrical connection to, or is in signal connection to, or is in electrical connection to and in signal connection to a circuit of the electric control board.

3. The electronic expansion valve according to claim 2, wherein the sensor comprises a body, a sensing head and a connecting portion, wherein the sensing head is securely connected to the body, the connecting portion is securely connected to the body, the sensing head is in electrical connection to, or is in signal connection to, or is in electrical connection to and in signal connection to the connecting portion, and the sensing head is located in the second cavity or the second channel; and the connecting portion comprises a resilient element, the resilient element is configured to abut against the first abutting portion, and a length of the resilient element between the electric control board and the sensor is less than a length of the resilient element in a natural state.

4. The electronic expansion valve according to claim 3, wherein the sensor comprises two or more resilient elements, and the sensor further comprises a conducting plate, wherein the conducting plate is securely connected to the body, the two or more resilient elements are securely welded with the conducting plate, the sensing head is securely connected to the conducting plate, and the sensing head is in electrical connection to, or is in signal connection to, or is in electrical connection to and in signal connection to the conducting plate.

5. The electronic expansion valve according to claim 3, wherein the control portion comprises a support portion, wherein the support portion is formed protruding from the cover body towards the control cavity, the support portion is configured to abut against the first surface, a position where the support portion is in contact with the first surface is in one-to-one correspondence with a position of the second surface where the first abutting portion is located, or the position where the support portion is in contact with the first surface is located in a region surrounded by the first abutting portion.

6. The electronic expansion valve according to claim 5, wherein the two or more resilient elements each are a spring, an accommodating cavity is formed in the body, one part of the spring is accommodated in the accommodating cavity, another part of the spring is exposed out of the body, the first abutting portion comprises a conductive layer formed on the electric control board, and the another part of the spring exposed out of the body is configured to abut against the conductive layer.

7. The electronic expansion valve according to claim 6, wherein the body comprises a limit portion, wherein the limit portion is a non-rotating body, the limit portion comprises a limit surface, the limit surface is distributed in a circumferential direction of the limit portion, at least part of the limit portion protrudes out of an outer edge of the body, and the second mounting portion comprises a cooperating portion and an abutting surface, wherein the cooperating portion comprises a cooperating surface, the cooperating surface is formed on a side wall of the second mounting portion, the limit surface is configured to abut against the cooperating surface, the abutting surface is disposed more adjacent to a bottom of the second mounting portion than the cooperating portion, and a lower end surface of the limit portion is configured to abut against the abutting surface.

8. The electronic expansion valve according to claim 7, comprising a first gland nut, wherein an outer periphery of the first gland nut is formed with a thread, the second mounting portion comprises a threaded portion, the threaded portion is disposed farther away from the bottom of the second mounting portion than the cooperating portion, the threaded portion is formed on the side wall of the second mounting portion, the first gland nut is threadedly connected to the threaded portion, and a lower end surface of the first gland nut is configured to abut against an upper end surface of the limit portion.

9. The electronic expansion valve according to claim 1, wherein the opening of the first cavity and the opening of the second cavity are located on a first side wall of the valve body, a first portion comprising the cover body is injection-molded and formed with the stator assembly as an insert, an opening of the control cavity is configured to face towards the valve body, the cover body comprises a first ring portion, wherein the first ring portion is disposed around the outer periphery of the control cavity, the first ring portion is formed adjacent to an outer edge of the control portion, the first ring portion or the first side wall is formed with a first groove, and the first groove is located at an outer periphery of the opening of the first cavity and the opening of the second cavity, the first sealing element is limited in the first groove, a depth of the first groove is less than a height of the first sealing element, the first side wall is configured to compress the first sealing element tightly against the first ring portion, and the first side wall is configured to abut against the first ring portion.

10. The electronic expansion valve according to claim 1, wherein the opening of the first cavity and the opening of the second cavity are located on a first side wall of the valve body, a first portion comprising the cover body is injection-molded and formed with the stator assembly as an insert, the cover body comprises a first ring portion, the first ring portion is formed adjacent to an outer edge of the control portion, the first side wall or the first ring portion is formed with a first groove, and the first groove is located at an outer periphery of the opening of the second cavity, at least part of the first groove is located between the opening of the first cavity and the opening of the second cavity, the first sealing element is limited in the first groove, a depth of the first groove is less than a height of the first sealing element, the first side wall is configured to compress the first sealing element tightly against the first ring portion, and the first side wall is configured to abut against the first ring portion.

11. The electronic expansion valve according to claim 1, wherein the opening of the first cavity and the opening of the second cavity are located on a first side wall of the valve body, the cover body comprises a first housing and a second housing, a first portion comprising the second housing is injection-molded and formed with the stator assembly as an insert, an opening of the control cavity is configured to face away from the valve body, the first housing is sealingly and securely connected to the second housing, the second housing is formed with a first communication hole, the first sealing element is around an outer periphery of the first communication hole, the second housing is configured to compress the first sealing element tightly against the valve body, the second housing comprises a first ring portion, the first ring portion is around the outer periphery of the first communication hole, the first ring portion or the first side wall is formed with a first groove, and the first sealing element is limited in the first groove, a depth of the first groove is less than a height of the first sealing element, the first side wall is configured to compress the first sealing element tightly against the first ring portion, and the first side wall is configured to abut against the first ring portion.

12. The electronic expansion valve according to claim 9, wherein the cover body comprises limit bolts, the limit bolts are located on an outer side of the first groove, and wherein two or more limit bolts are provided, the valve body comprises positioning holes, a number of the positioning holes is equal to a number of the limit bolts, and each of the limit bolts is inserted into a respective one of the positioning holes.

13. The electronic expansion valve according to claim 12, further comprising a fastening device the fastening device is a bolt or a screw, wherein the cover body comprises a second communication hole, wherein the second communication hole is formed on the first ring portion, the second communication hole is disposed more adjacent to an outer edge of the cover body than the limit bolts, the valve body comprises a threaded hole, and the fastening device is configured to pass through the second communication hole and be threadedly connected to the threaded hole.

14. The electronic expansion valve according to claim 13, wherein each of the at least one engaging groove and the first groove are disposed together on the valve body or on the first ring portion, and the each of the at least one engaging groove is communicated with the first groove.

* * * * *